US011890165B2

(12) United States Patent
Liang et al.

(10) Patent No.: US 11,890,165 B2
(45) Date of Patent: Feb. 6, 2024

(54) DENTAL IMPLANT WITH NANO BACTERIOSTATIC STRUCTURE RING AT TRANSGINGIVAL PART AND MACHINING METHOD THEREOF

(71) Applicant: BEIJING VANJEWEL MEDICAL TECH CO., LTD, Beijing (CN)

(72) Inventors: Chunyong Liang, Beijing (CN); Hongshui Wang, Beijing (CN); Xianrui Zou, Beijing (CN)

(73) Assignee: BEIJING VANJEWEL MEDICAL TECH CO., LTD, Beijing (CN)

(*) Notice: Subject to any disclaimer, the term of this patent is extended or adjusted under 35 U.S.C. 154(b) by 0 days.

(21) Appl. No.: 18/324,861

(22) Filed: May 26, 2023

(65) Prior Publication Data
US 2023/0293269 A1 Sep. 21, 2023

Related U.S. Application Data

(63) Continuation of application No. PCT/CN2022/097096, filed on Jun. 6, 2022.

(30) Foreign Application Priority Data
Jun. 17, 2021 (CN) .......................... 202110673152.8

(51) Int. Cl.
*A61C 8/00* (2006.01)
*B23K 26/38* (2014.01)
(52) U.S. Cl.
CPC ............ *A61C 8/0037* (2013.01); *B23K 26/38* (2013.01); *A61C 2008/0046* (2013.01)
(58) Field of Classification Search
CPC .... A61C 8/00–0098; A61C 2008/0046; B23K 26/38; B23K 26/355; B23K 26/362; B23K 26/364
See application file for complete search history.

(56) References Cited

U.S. PATENT DOCUMENTS

| 6,419,491 B1 * | 7/2002 | Ricci ................... A61F 2/30771 433/173 |
| 2009/0061387 A1 * | 3/2009 | Lomicka .............. A61C 8/0024 433/173 |

(Continued)

FOREIGN PATENT DOCUMENTS

| CN | 101264550 A | 9/2008 |
| CN | 101264551 A | 9/2008 |

(Continued)

OTHER PUBLICATIONS

Internation Search Report of PCT/CN2022/097096, dated Aug. 24, 2022.

*Primary Examiner* — Yogesh P Patel

(57) ABSTRACT

Provided are a dental implant with a nano bacteriostatic structure ring at a transgingival part and a machining method thereof. The transgingival part of the dental implant has a three-level micro-nano composite structure, and the three-level micro-nano composite structure endows a surface of the transgingival part of the implant with functions of promoting adhesion and proliferation of a gingival fibroblast and a gingival mesenchymal stem cell and inhibiting adhesion and growth of various oral bacteria. A preparation method thereof comprises: firstly, injecting bioactive, wear-resistant or corrosion-resistant C, N, Ca and P elements into the transgingival part of the dental implant by a plasma injection method; and then, preparing the three-level micro-nano composite structure at a part in which the elements are injected.

5 Claims, 6 Drawing Sheets

(56) References Cited

U.S. PATENT DOCUMENTS

| | | | |
|---|---|---|---|
| 2009/0061388 A1* | 3/2009 | Collins | A61C 8/0012 |
| | | | 433/174 |
| 2009/0233256 A1* | 9/2009 | Schroering | A61C 8/0022 |
| | | | 433/174 |
| 2011/0160869 A1 | 6/2011 | Duch et al. | |
| 2020/0149145 A1 | 5/2020 | Allain et al. | |

FOREIGN PATENT DOCUMENTS

| | | | | |
|---|---|---|---|---|
| CN | 102743789 | A | 10/2012 | |
| CN | 103519911 | A | 1/2014 | |
| CN | 203539464 | U | 4/2014 | |
| CN | 106388957 | A | 2/2017 | |
| CN | 106637346 | A | 5/2017 | |
| CN | 110811882 | A | 2/2020 | |
| CN | 111658236 | A | 9/2020 | |
| CN | 111728726 | A | 10/2020 | |
| JP | 2010227551 | A | 10/2010 | |
| WO | WO2006096793 | A2 * | 9/2006 | A61F 2/02 |

* cited by examiner

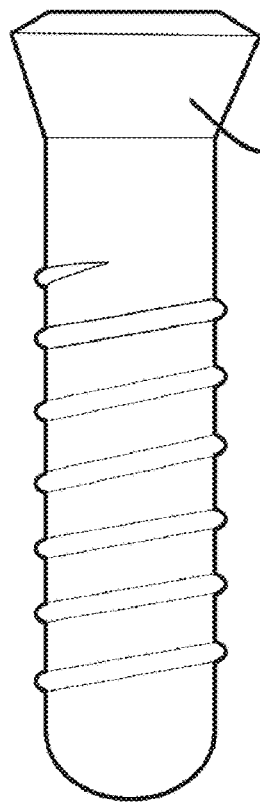
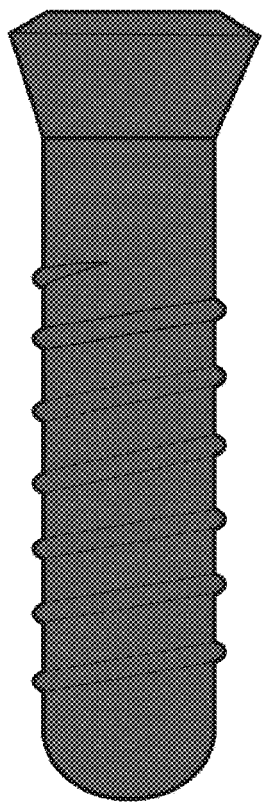
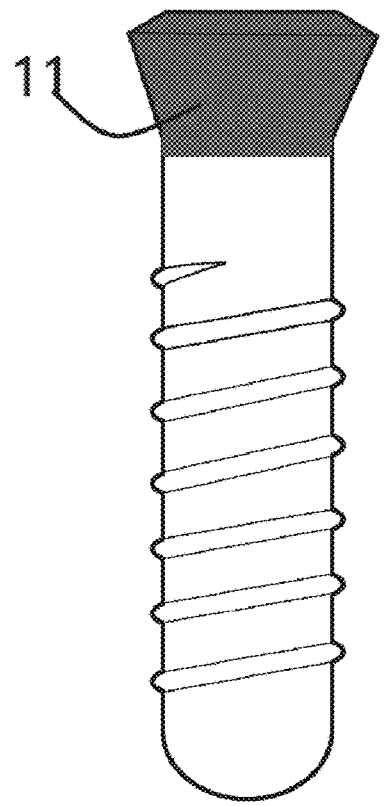
FIG. 1a  FIG. 1b  FIG. 1c
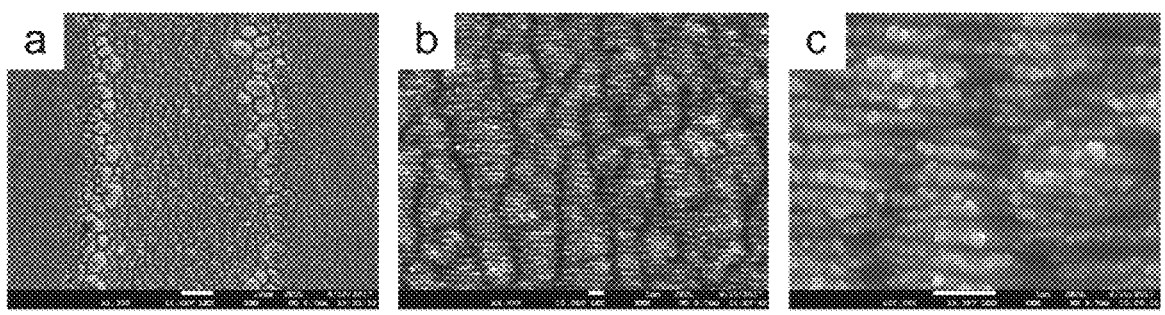
FIG. 2

DENTAL IMPLANT WITH NANO BACTERIOSTATIC STRUCTURE RING AT TRANSGINGIVAL PART AND MACHINING METHOD THEREOF

CROSS-REFERENCE TO RELATED APPLICATIONS

This application is a continuation of International Patent Application No. PCT/CN2022/097096 with a filing date of Jun. 6, 2022, designating the United States, now pending, and further claims priority to Chinese Patent Application No. 202110673152.8 with a filing date of Jun. 17, 2021. The content of the aforementioned applications, including any intervening amendments thereto, are incorporated herein by reference.

TECHNICAL FIELD

The present invention belongs to the field of oral implants, and relates to a surface structure design of a dental implant, and particularly to a dental implant with functions of promoting adhesion of a gingival fibroblast and a gingival mesenchymal stem cell and inhibiting adhesion of various oral bacteria to a nano structure ring at a transgingival part.

BACKGROUND OF THE PRESENT INVENTION

In recent years, with the rapid development of social modernization, people pay more and more attention to oral health. As one of the important means to treat dental defect, dental implant has been more widely used in clinic. With the deepening of clinical practice, the concern about infection around the implant continues to increase. After the dental implant is implanted, bacteria in oral cavity may easily enter a periodontium through a binding part between gingiva and implant to cause periodontitis, even leading to implant failure. Therefore, it is urgent to develop an implant with dual functions of preventing periodontitis and accelerating gingival-implant interface integration. However, there are obvious disadvantages in an existing technology of endowing a surface of the implant with a bacteriostatic ability, for example, a chemical grafting method can improve a bacteriostatic performance of the surface of the implant, but the related art cannot meet the requirements of quality control, sterilization and long-term preservation in the production of medical device, and a grafted chemical coating cannot maintain the efficacy in a complex oral environment for a long time, thus being difficult to pass current supervision and approval of the registration certificate for medical device. At present, there is no implant capable of preventing periodontitis and accelerating gingival-implant interface integration in China.

SUMMARY OF PRESENT INVENTION

The present invention aims to provide a design of a dental implant with a surface having dual functions of preventing periodontitis and accelerating gingival-implant interface integration at a transgingival part, and the surface has functions of inhibiting adhesion of various oral bacteria and promoting growth of a gingival mesenchymal stem cell and a gingival fibroblast.

A technical solution used to realize the present invention is as follows.

Firstly, bioactive, wear-resistant or corrosion-resistant C, N, Ca and P elements are injected into a transgingival part of an implant tooth by a plasma injection method; and a depth of plasma injection is 500 nm to 2,000 nm. Then, a three-level micro-nano structure is prepared at a part in which the elements are injected.

By adjusting related process parameters such as an atmosphere composition and a voltage during plasma injection, types and an injection depth of the injected elements may be controlled. C, N and other elements can effectively strengthen the surface, improve the corrosion resistance and wear resistance of the surface of the implant at the transgingival part, and improve the stability and long-term reliability of the implant after implantation. Ca, P and other elements can effectively improve the biological activity of the surface, effectively promote the adhesion and proliferation of the gingival fibroblast and the gingival mesenchymal stem cell, and accelerate the interface integration of the implant and the gingiva.

Subsequently, the three-level micro-nano composite structure is prepared on the surface at the transgingival part. The three-level micro-nano composite structure is formed by superposing structures of three levels of sizes. A first-level structure is a micron-level groove structure with a width of 20 $\mu$m to 60 $\mu$m and a depth of 1 $\mu$m to 2 $\mu$m; a second-level structure is composed of a stripe with a width of 100 nm to 500 nm and a height of 50 nm to 200 nm, or an array protrusion with a height of 50 nm to 200 nm, and the second-level structure is distributed on a surface of the first-level structure; and a third-level structure is composed of a nano particle, a nano rod, a nano cone and other structures with a sub-micron or nano scale, and the third-level structure is distributed on a surface of the second-level structure. Due to a size effect, the first-level structure above effectively increases a surface area of a material, with a size similar to those of the gingival fibroblast and the gingival mesenchymal stem cell, which is beneficial for the adhesion and growth of the two cells on the surface. The second-level structure improves a surface roughness, provides an adhesion site for adhering the gingival fibroblast and the gingival mesenchymal stem cell, and these structures effectively reduce the adhesion of various oral bacteria at the same time. The third-level structure may kill bacteria, without affecting the growth of the gingival fibroblast and the gingival mesenchymal stem cell. A comprehensive effect of the three structures above makes the surface have a function of inhibiting the adhesion of bacteria, so as to have a function of preventing the bacteria from entering a periodontal tissue through a gap in a gingival-implant interface in an early stage of implant implantation, and meanwhile, the micro-nano composite structure can promote the growth of the gingival fibroblast, so as to accelerate gingival and implant interface integration, thus isolating the periodontal tissue from external bacteria.

The three-level micro-nano structure is machined by a pulse laser. Specific machining steps of the pulse laser are as follows: firstly, a size of the implant and a size of a machining position are measured. Subsequently, a laser device is turned on, and machining parameters such as power, a frequency, a scanning speed and a machining line spacing are adjusted, so that a light spot is irradiated on a starting machining position of the transgingival part. A distance between a laser focal point and a laser machining position is kept unchanged, and a surface of the entire transgingival part is scanned. Machining parameters of the pulse laser are: a laser frequency of 1 kHz to 10 kHz, pulse energy of 3,000 uJ to 8,000 uJ, a light spot diameter of 50

μm to 60 μm, a line spacing of 40 μm to 60 μm, and a scanning speed of 10 mm/s to 20 mm/s.

The effects of promoting the adhesion and proliferation of the gingival fibroblast and the gingival mesenchymal stem cell and inhibiting the adhesion and growth of various oral bacteria can be achieved only by preparing the three-level micro-nano composite structure on the surface of the transgingival part, without carrying out ion implantation. However, better effects of promoting the adhesion of the gingival fibroblast and the gingival mesenchymal stem cell and inhibiting the adhesion of the oral bacteria can be achieved by a combined action of ion implantation of active elements and the three-level micro-nano composite structure.

The present invention provides the dental implant with the surface having the dual functions of preventing periodontitis and accelerating gingival-implant interface integration at the transgingival part and the preparing method thereof, the surface of the transgingival part is provided with a coating containing C, N, Ca, P and other elements, the coating can improve the biological activity of the surface of the transgingival part, effectively improve the adhesion and growth of the gingival fibroblast and the gingival mesenchymal stem cell on the surface, accelerate the gingival and implant interface integration, and also effectively improve the wear resistance and corrosion resistance of the surface. Meanwhile, the surface has the three-level micro-nano composite structure, the physical structure can inhibit the adhesion and growth of various oral bacteria on the surface, so as to prevent the bacteria from entering the periodontal tissue through the gap in the gingival-implant interface in the early stage of implant implantation, and meanwhile, the structure can promote the growth of the gingival fibroblast and the gingival mesenchymal stem cell, so as to accelerate the gingival and implant interface integration, thus isolating the periodontal tissue from the external bacteria. The design of the implant has great application potential in the field of dental implantation.

The present invention has the beneficial effects as follows: according to the present invention, the surface with the bioactive components and the micro-nano composite structure is prepared at the transgingival part of the implant, so that the adhesion and proliferation of the gingival fibroblast and the gingival mesenchymal stem cell can be effectively promoted and the adhesion and growth of various oral bacteria can be inhibited at the same time, a periodontal infection risk after the implant is implanted can be effectively reduced, and a success rate of implantation is improved; and meanwhile, only surface processing of the implant is designed for preparing of a bacteriostatic ring, which does not conflict with an existing implant production process, and can also reduce a difficulty of registration and approval of related implant products.

DESCRIPTION OF THE DRAWINGS

FIG. 1a, FIG. 1b and FIG. 1c are schematic diagrams of an implant, a plasma processing region on a surface of the implant and a femtosecond laser processing region on the surface of the implant in Embodiment 1 respectively;

FIG. 2 shows a micro-morphology of a surface of the femtosecond laser machining region in Embodiment 1, wherein a, b and c are diagrams of first-level, second-level and third-level structures respectively;

DETAILED DESCRIPTION OF PREFERRED EMBODIMENTS

The present invention is further described in detail hereinafter with reference to specific embodiments.

Embodiment 1

In this embodiment, plasma injection and femtosecond laser machining methods were used to prepare a bacteriostatic bioactive surface on a surface of a transgingival part 1 of an implant.

Specific steps and process were as follows.

Figure 9:
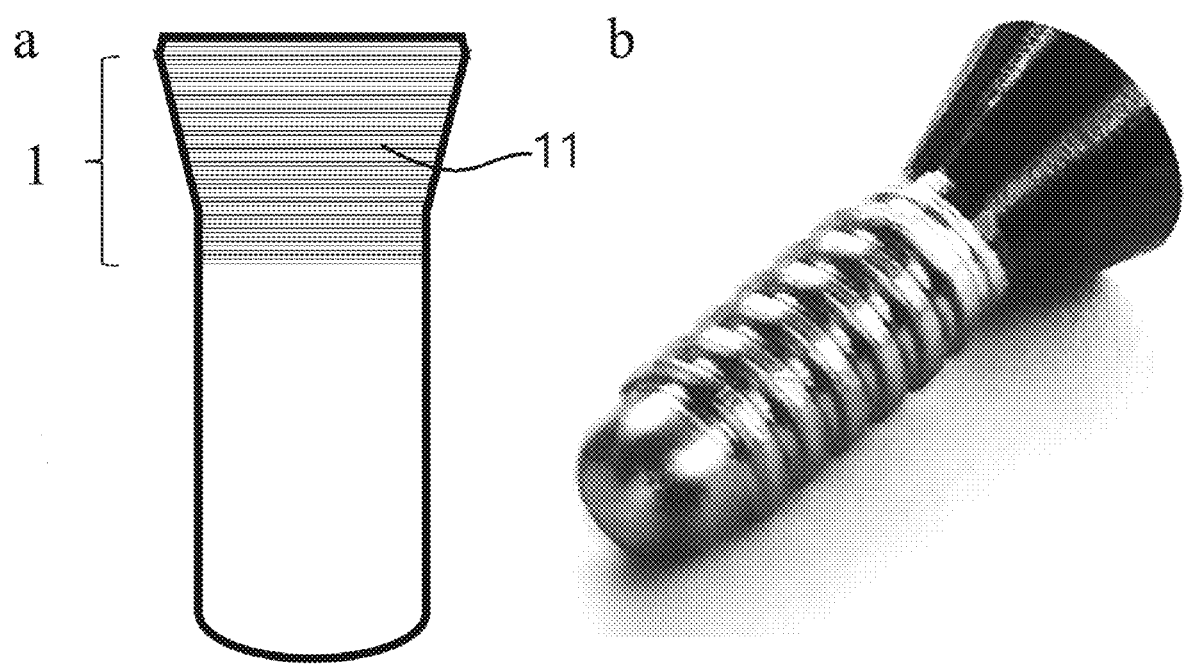
FIG. 9 shows a schematic diagram of the implant and a real product picture of the implant, wherein a is the diagram of the implant, and b is the real product picture of the implant.

(1) Firstly, C, N, Ca and P elements were injected into the surface of the implant by the plasma injection method. A pure Ti implant was placed in an atmosphere containing the C, N, Ca and P elements, and a composition layer containing the four elements above was prepared in a range from the surface of the implant to a depth of 500 nm from the surface by a metal plasma immersion injection technology. FIG. 1a and FIG. 9 was a schematic diagram of the implant. FIG. 1b was a schematic diagram of a processing part of the plasma injection method, and a dark part was a plasma injection region.

(2) A size of the implant and a size of a machining position were measured. The implant used in this case had a length of 8 mm, wherein the transgingival part 1 had a length of 3 mm, a bone binding part had a diameter of 3.5 mm, and the transgingival part 1 had a widest neck part of 4.8 mm.

(3) The implant was fixed on a four-axis translation table. A laser device was turned on, and laser parameters were adjusted. A position of a light spot was adjusted, so that the light spot of the laser was irradiated on an initial position of the transgingival part 1. The machining process was that: the surface of the transgingival part was machined by a laser frequency of 1 kHz, pulse energy of 8,000 uJ, a light spot diameter of 50 μm, a line spacing of 50 μm and a scanning speed of 10 mm/s, a rotating axis was rotated by one circle during machining, a Y axis was translated by 0.1 mm, and an X axis was moved at the same time to ensure that a distance from a focal point of the laser to a surface of a sample remained unchanged, so that the surface of the whole transgingival part 1 was covered repeatedly, and a three-level micro-nano composite structure 11 was synchronously induced and generated on the surface of the transgingival part 1.

Figure 3:
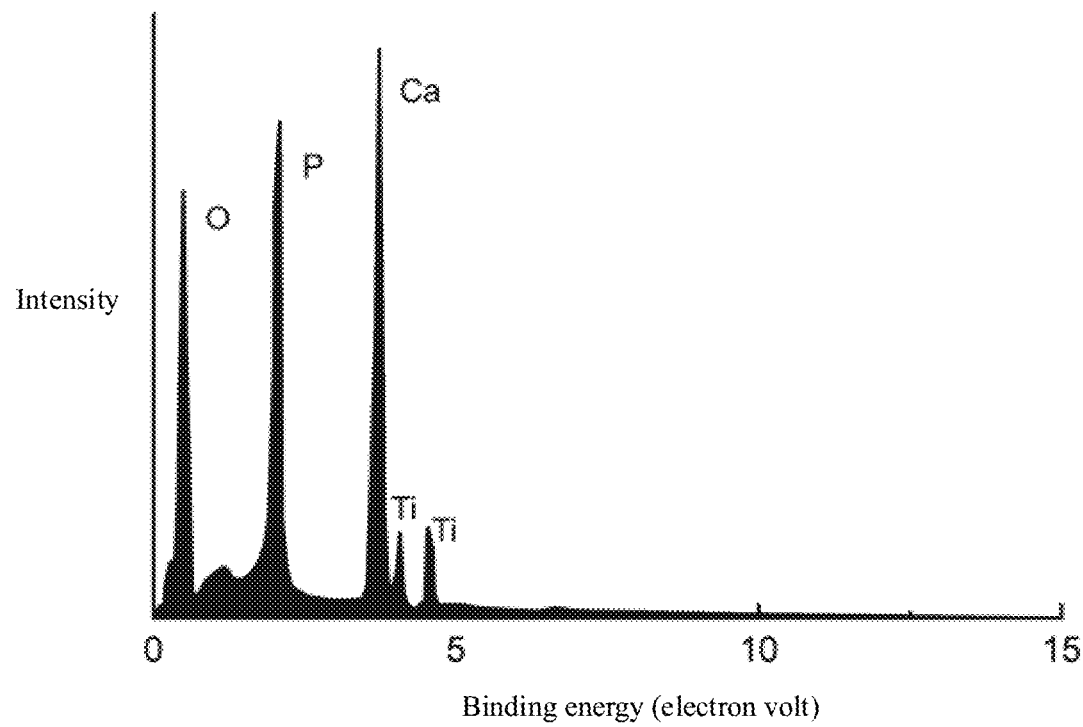
FIG. 3 is a composition analysis diagram of the surface of the femtosecond laser machining region in Embodiment 1.
Figure 8:
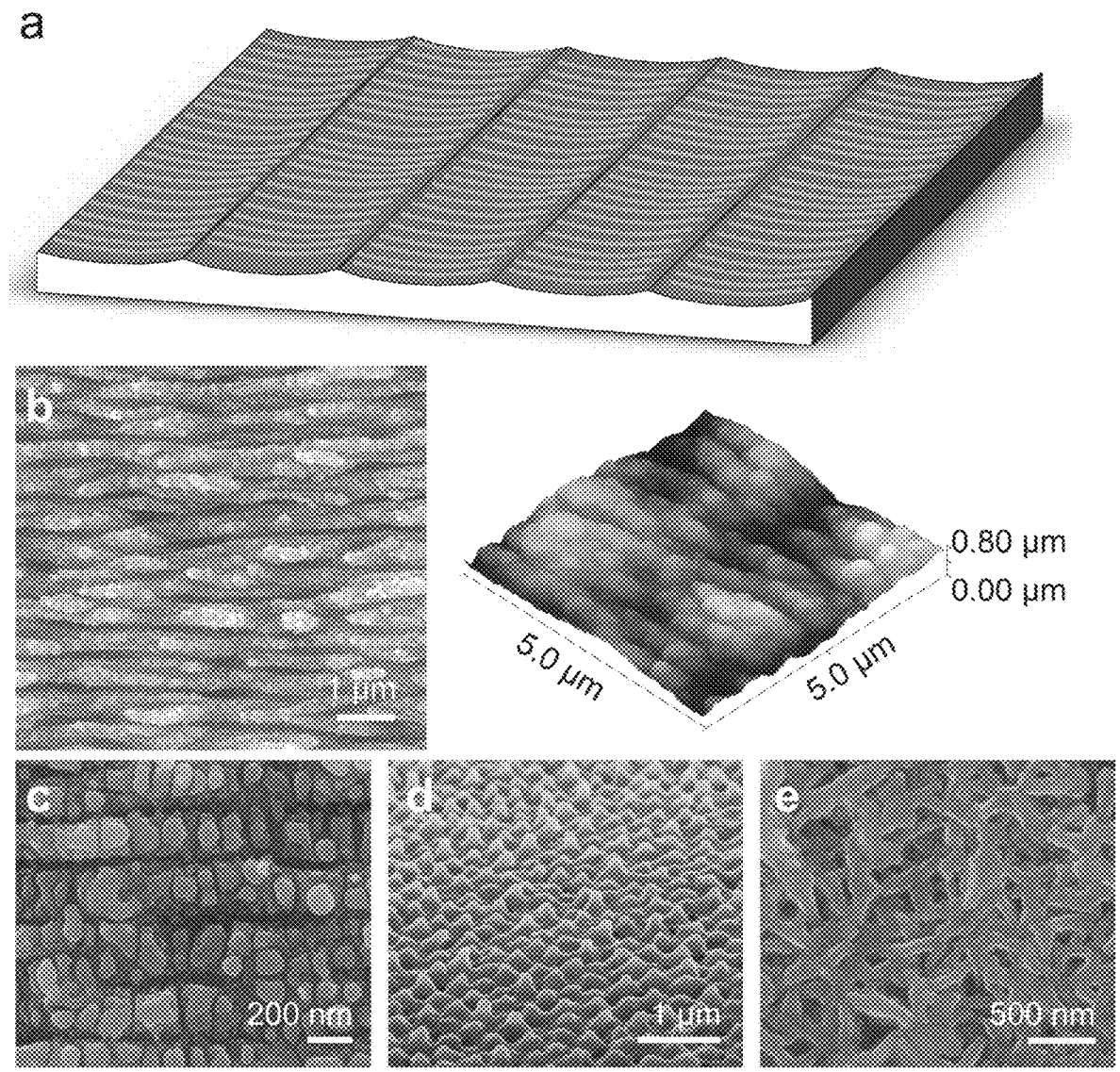
FIG. 8 shows the microscopic morphology of the micro-level groove, stripe of the second-level structure, and array protrusion, a nano rod, and a nano cone; wherein a, b, c, d, and e are diagrams of the micro-level groove, the stripe, the array protrusion, the nano cone, and the nano rod, respectively.

FIG. 2 showed a morphology of the surface of the part after machining, wherein a, b and c respectively showed a first-level structure, a second-level structure and a third-level structure in the three-level micro-nano composite structure 11. FIG. 3 showed chemical composition of the surface of the transgingival part 1 of the implant obtained. FIG. 1c showed the laser machining region. FIG. 8 shows the microscopic morphology of the micro-level groove, stripe of the second-level structure, and array protrusion, a nano rod, and a nano cone; wherein a, b, c, d, and e are diagrams of the micro-level groove, the stripe, the array protrusion, the nano cone, and the nano rod, respectively.

(4) The machined implant was taken down, cleaned, sterilized and packaged.

Comparative Example 1

In this comparative example, influences of a pure titanium polished surface, a polished titanium surface with a bioactive component, a titanium surface with a three-level micro-nano composite structure 11 and a titanium surface with the bioactive component and the micro-nano composite structure on adhesion and growth of various cells and bacteria on the surfaces were compared through an in-vitro cell experiment and a bacteriostatic adhesion experiment.

A preparation method of the pure titanium polished surface (surface a) was that: a pure titanium surface was polished by a mechanical polishing method. A preparation method of the polished titanium surface with the bioactive component (surface b) was that: firstly, the polished pure titanium surface was prepared by the mechanical polishing method, and subsequently, Ca, P, C and N elements were injected into the surface by a metal plasma immersion injection technology, wherein parameters of the plasma injection process were the same as those used in Embodiment 1. A preparation method of the titanium surface with the three-level micro-nano composite structure (surface c) was that: firstly, the polished titanium surface was prepared by the mechanical polishing method, and subsequently, the micro-nano composite structure was prepared on the surface by a femtosecond laser machining method, wherein the femtosecond laser machining process was the same as that in Embodiment 1. A preparation method of the titanium surface with the bioactive component and the micro-nano composite structure (surface d) was that: the titanium surface containing Ca, P, C and N elements was prepared by the same method as that of the surface b, and subsequently, the micro-nano structure was prepared on the surface by the femtosecond laser machining method, wherein the preparation process was the same as the femtosecond laser machining process in Embodiment 1.

Firstly, an adhesion experiment of a gingival fibroblast and a gingival mesenchymal stem cell was carried out. 40 µl of $5\times10^4$/ml gingival fibroblast suspension and 40 µl of $5\times10^4$/ml gingival mesenchymal stem cell suspension were dropwise added on surfaces of four samples respectively, and cultured for 24 hours respectively, then the surfaces were washed with PBS, and numbers of cells adhered to the surfaces of the four samples were compared by a CCK-8 method.

Figure 4:
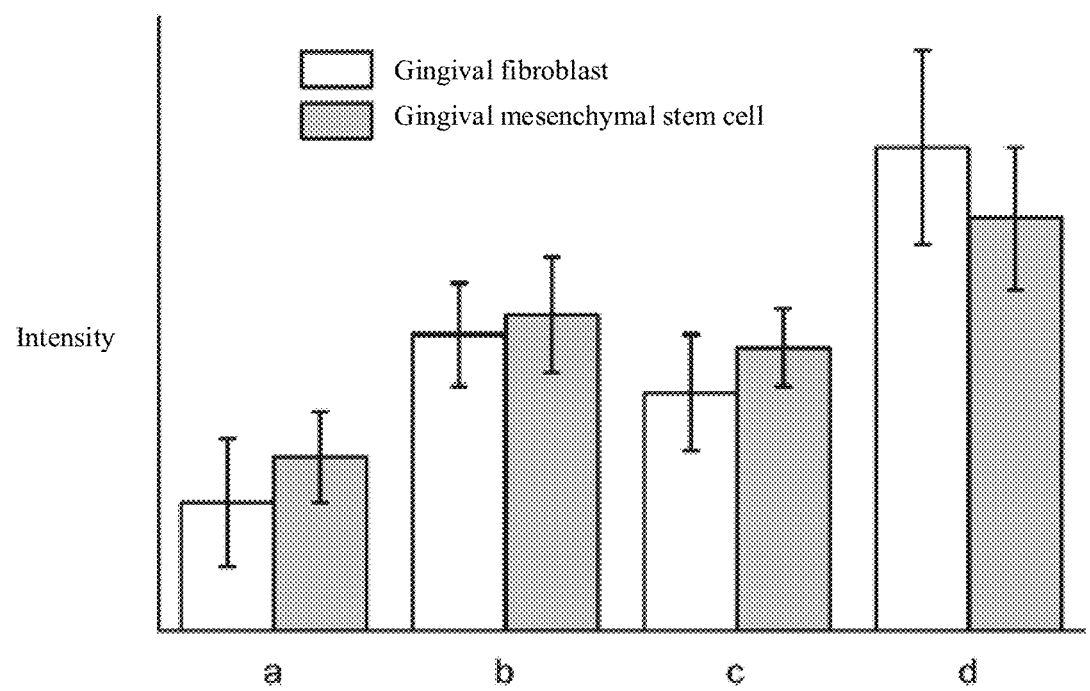
FIG. 4 is a comparative diagram of adhesion conditions of a gingival fibroblast and a gingival mesenchymal stem cell on four surfaces in Comparative Example 1.

FIG. 4 showed statistical results of OD values of the surfaces of the four samples. The OD value of the surface a was the lowest, and the OD values of the surfaces b and c were higher than that of the surface a, which indicated that the adhesion of the gingival fibroblast and the gingival mesenchymal stem cell could be promoted by injecting the bioactive component into the pure titanium surface by the plasma injection method and preparing the micro-nano composite structure on the surface by the femtosecond laser machining method. The OD value of the surface d was significantly higher than those of the other three surfaces, which indicated that the adhesion and proliferation of the two cells could be significantly promoted by surface active component injection combined with micro-nano composite structure preparation.

Subsequently, an adhesion experiment of *Escherichia coli* and *Staphylococcus aureus* on the four surfaces was carried out. 40 µl of $10^6$/ml *Escherichia coli* liquid and 40 µl of $10^6$/ml *Staphylococcus aureus* liquid were dropwise added on the surfaces of the four samples respectively, and cultured for 6 hours, then the bacterial liquids on the surfaces were washed with PBS, subjected to fluorescence staining, and observed by a laser confocal microscope, and fluorescence intensities of any 10 positions on each surface were counted.

Figure 5:
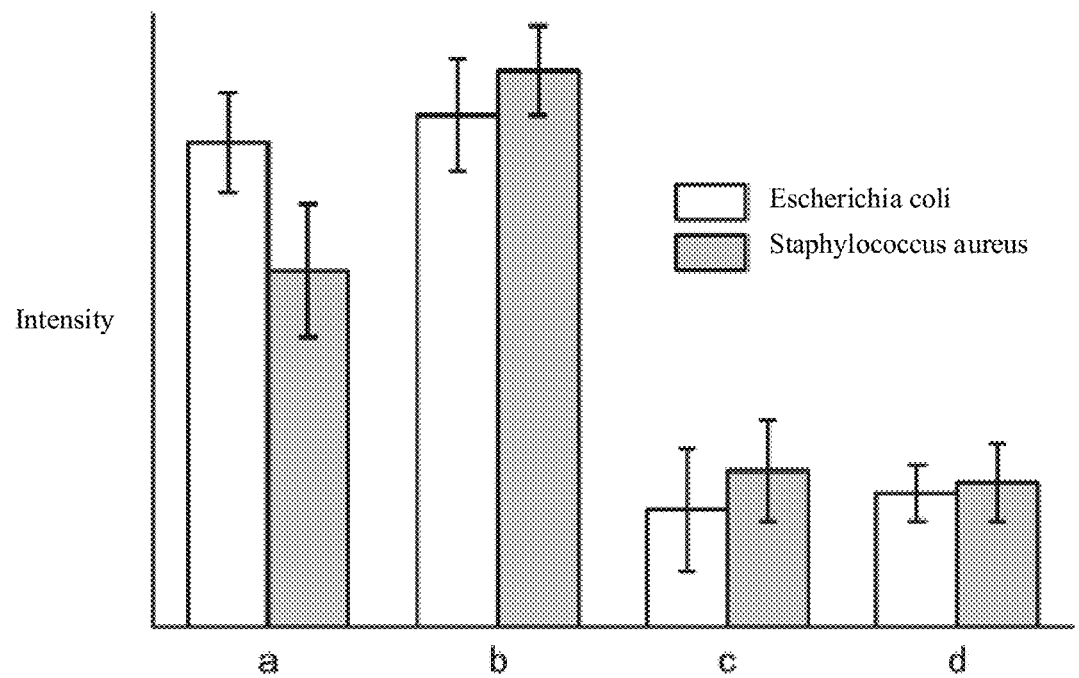
FIG. 5 is a comparative diagram of adhesion conditions of *Escherichia coli* and *Staphylococcus aureus* on four surfaces in Embodiment 1.

As shown in FIG. 5, the two bacteria were adhered to the surfaces a and b in large quantities. Bacterial adhesion quantities on the surface c and the surface d were obviously smaller than those on the surface a and the surface b, which indicated that the micro-nano composite structure had an obvious inhibitory effect on the adhesion of the two bacteria. It was worth noting that the bacterial adhesion quantity on the surface b was slightly higher than that on the surface a, which indicated that the bacterial adhesion on the surface b was slightly promoted after the surface b had a high biological activity, and the bacterial adhesion quantity on the surface d was basically the same as that on the surface c, which indicated that the inhibition effect on bacterial adhesion of the micro-nano composite structure eliminated the influence of increased bacterial adhesion caused by the improved biological activity of the surface d.

Results of the experiment of the cells and the experiment of the bacteria above showed that the surface with the bioactive component and the micro-nano composite structure prepared on the surface of the implant by the plasma injection method combined with the femtosecond laser machining method had dual functions of promoting the adhesion and proliferation of the gingival fibroblast and the gingival mesenchymal stem cell and inhibiting the adhesion of the *Escherichia coli* and the *Staphylococcus aureus*.

Comparative Example 2

In this comparative example, wear resistance performances of a pure titanium surface with a micro-nano composite structure and a titanium surface with the micro-nano composite structure injected with C, N, Ca and P elements were compared. The pure titanium surface with the micro-nano composite structure was prepared according to the preparation method of the surface c in Comparative Example 1, and the titanium surface with the micro-nano composite structure injected with C, N, Ca and P elements was prepared according to the preparation method of the surface d in Comparative Example 1.

Figure 6:
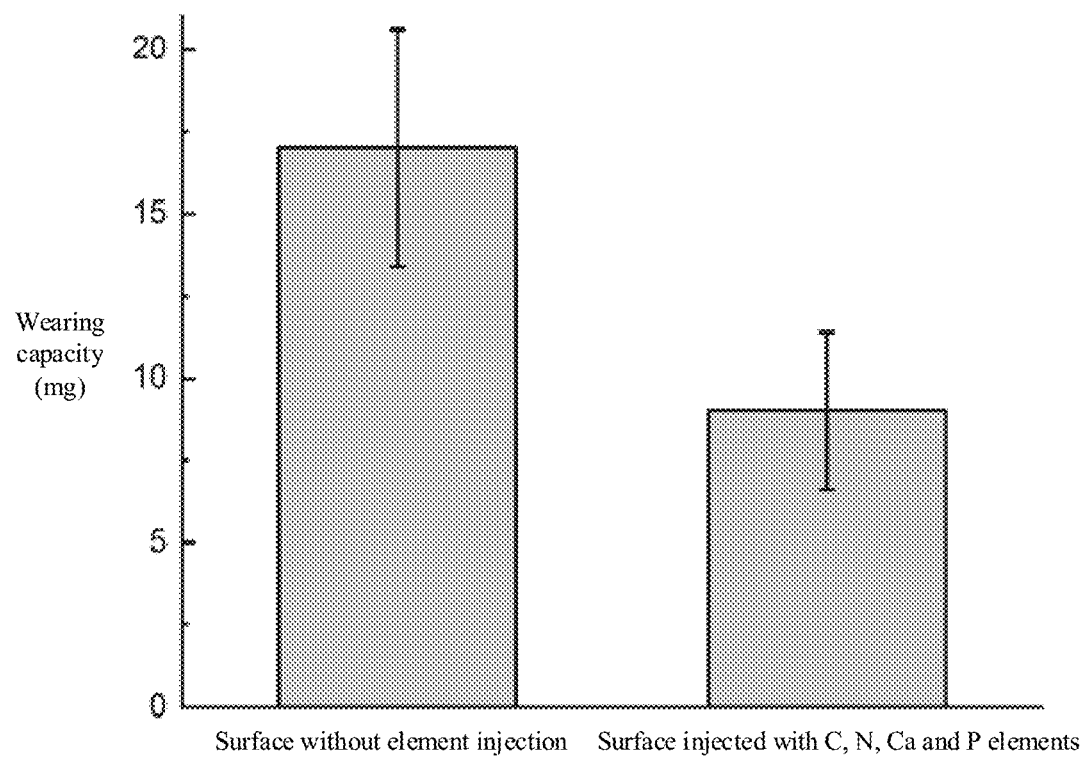
FIG. 6 is a comparative diagram of wear resistance performances of two surfaces in Comparative Example 2.

The wear resistance performances of the two surfaces were tested by a wear tester, dry friction was carried out on the surfaces by a $Si_3N_4$ grinding ball at a rotating speed of 300 r/min and a load of 200 N, and after the friction was carried out for 30 minutes, wearing capacities of the two surfaces were counted respectively. As shown in FIG. 6, after the friction was carried out for 30 minutes, the wearing capacity of the surface injected with the elements was obviously lower than that of the pure titanium surface, which indicated that the wear resistance performance of the surface injected with the elements by the plasma injection method was obviously improved.

Comparative Example 3

In this comparative example, adhesion conditions of various common oral bacteria on a smooth pure titanium surface and a titanium surface with a bioactive component and a micro-nano composite structure were compared.

A preparation method of the pure titanium surface was that: the pure titanium surface was processed by a mechanical polishing method. The surface with the bioactive component and the micro-nano composite structure was prepared by the method in Embodiment 1. Bacteria selected for a bacteriostasis experiment comprised alpha *streptococcus, anaerobic streptococcus, staphylococcus epidermidis, Neisseria, lactobacillus, spirochete* and *candida* respectively. Numbers of bacteria adhered to the two surfaces were counted by a fluorescence intensity statistic method and a plate counting method respectively.

Figure 7:
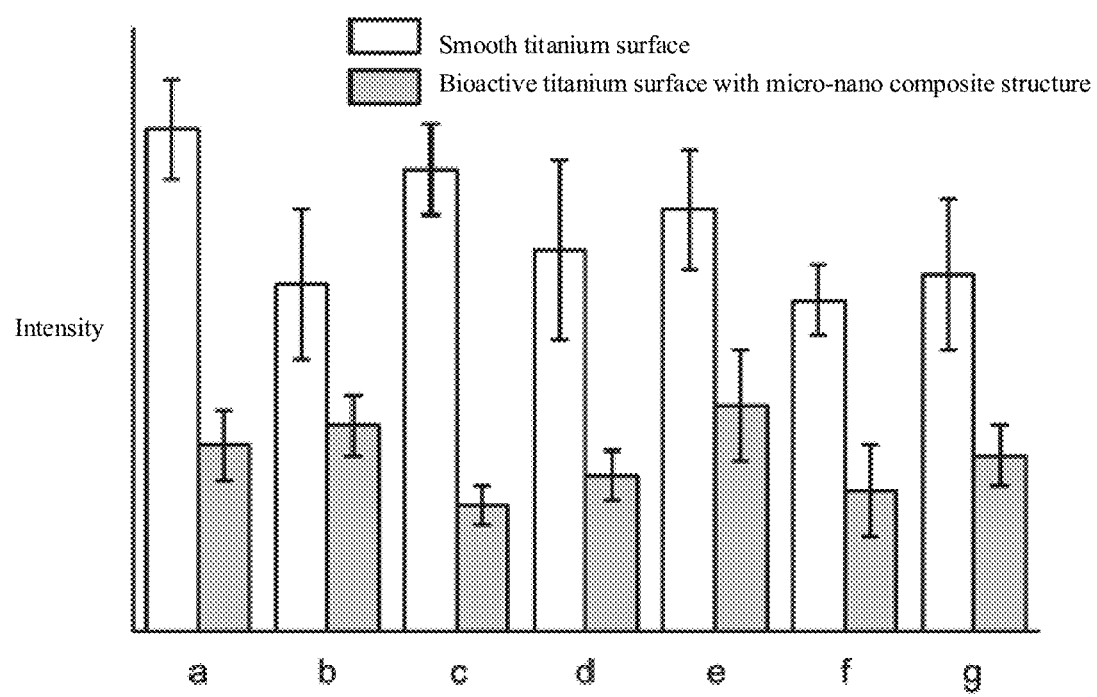
FIG. 7 is a comparative diagram of adhesion conditions of oral bacteria on two surfaces in Comparative Example 3, wherein a to g are alpha *streptococcus, anaerobic streptococcus, staphylococcus epidermidis, Neisseria, lactobacillus, spirochete* and *candida* respectively.

The fluorescence intensity statistical experiment method was that 40 μl of $10^6$/ml *Escherichia coli* liquid and 40 μl of $10^6$/ml *Staphylococcus aureus* liquid were dropwise added on the surfaces of the four samples respectively, and cultured for 6 hours, then the bacterial liquids on the surfaces were washed with PBS, subjected to fluorescence staining, and observed by a laser confocal microscope, and fluorescence intensities of any 10 positions on each surface were counted. As shown in FIG. 7, since the polished titanium surface had no bacteriostatic performance, the seven oral bacteria were all adhered to the surface in large quantities, and adhesion quantities of the bacteria on the bioactive surface 7 with the micro-nano composite structure were all obviously less than those on the polished titanium surface. This result showed that, compared with the smooth pure titanium implant surface, the implant surface with the micro-nano composite structure and the bioactive component proposed by the present invention had a significant inhibitory effect on the adhesion of the common oral bacteria on the surface.

Embodiment 2

In this embodiment, femtosecond laser machining was carried out twice to obtain a required structure at a transgingival part 1. Specific femtosecond laser machining steps and process were as follows.

(1) A light spot of the laser was irradiated on an initial position of the transgingival part 1, and the transgingival part 1 of the implant was machined. The machining process was that: a surface of the transgingival part 1 was machined by a laser frequency of 10 kHz, pulse energy of 3,000 uJ, a light spot diameter of 60 μm, a line spacing of 50 μm and a scanning speed of 20 mm/s, a T axis was rotated by one circle during machining, a Y axis was translated by 0.2 mm, and an X axis was moved at the same time to ensure that a distance from a focal point of the laser to a surface of a sample remained unchanged, so that the surface of the whole transgingival part 1 was covered repeatedly.

(2) The X axis was moved to make the light spot of the laser return to a machining starting position of this part for secondary machining. The secondary machining process was that: the surface of the transgingival part 1 was machined by a laser frequency of 10 kHz, pulse energy of 200 uJ, a light spot diameter of 60 μm, a line spacing of 50 μm and a scanning speed of 20 mm/s, a T axis was rotated by one circle during machining, a Y axis was translated by 0.2 mm, and an X axis was moved at the same time to ensure that a distance from a focal point of the laser to a surface of a sample remained unchanged, so that the surface of the whole transgingival part 1 was covered repeatedly.

Others were the same as those in Embodiment 1.

The above are only the preferred embodiments of the present invention, and it should be pointed out that those of ordinary skills in the art may further make several modifications and improvements without departing from the concept of the present invention, and these modifications and improvements all fall within the scope of protection of the present invention.

We claim:

1. A dental implant, wherein a nano bacteriostatic structure ring is formed on a surface of a transgingival part;
   the nano bacteriostatic structure ring is a three-level micro-nano composite structure;
   the three-level micro-nano composite structure is formed by superposing a first-level structure, a second-level structure, and a third-level structure; wherein the second-level structure is distributed on a surface of the first-level structure, the third-level structure is distributed on a surface of the second-level structure;
   the first-level structure is a microgroove structure with a width of 20 μm to 60 μm and a depth of 1 μm to 2 μm;
   the second-level structure is composed of a stripe with a width of 100 nm to 500 nm and a height of 50 nm to 200 nm, or an array protrusion with a height of 50 nm to 200 nm; and
   the third-level structure is composed of a nano particle, a nano rod and a nano cone with submicron to nanometer dimensions.

2. A machining method of the dental implant according to claim 1, wherein the three-level micro-nano composite structure is machined by a pulse laser.

3. The machining method according to claim 2, wherein before the three-level micro-nano composite structure is machined, C, N, Ca and P elements are injected into a transgingival part of an implant tooth by a plasma injection method.

4. The machining method according to claim 2, wherein machining parameters of the pulse laser are: a laser frequency of 1 kHz to 10 kHz, pulse energy of 3,000 uJ to 8,000 uJ, a light spot diameter of 50 μm to 60 μm, a line spacing of 40 μm to 60 μm, and a scanning speed of 10 mm/s to 20 mm/s.

5. The machining method according to claim 3, wherein a depth of plasma injection is 500 nm to 2,000 nm.

* * * * *